US008503885B2

(12) United States Patent
Meyers et al.

(10) Patent No.: US 8,503,885 B2
(45) Date of Patent: Aug. 6, 2013

(54) QUANTUM BASED INFORMATION TRANSMISSION SYSTEM AND METHOD

(75) Inventors: Ronald Everett Meyers, Columbia, MD (US); Keith Scott Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 678 days.

(21) Appl. No.: 12/705,566

(22) Filed: Feb. 12, 2010

(65) Prior Publication Data

US 2010/0150222 A1 Jun. 17, 2010

Related U.S. Application Data

(63) Continuation-in-part of application No. 11/196,738, filed on Aug. 4, 2005, now Pat. No. 7,660,533.

(60) Provisional application No. 60/598,537, filed on Aug. 4, 2004.

(51) Int. Cl.
*H04B 10/00* (2006.01)
*H04B 10/12* (2006.01)

(52) U.S. Cl.
USPC .............................. 398/140; 398/162; 380/256

(58) Field of Classification Search
USPC ........... 398/140, 162, 206, 209, 213; 380/256
See application file for complete search history.

(56) References Cited

U.S. PATENT DOCUMENTS

| 5,757,912 | A | 5/1998 | Blow |
| 7,242,774 | B1 | 7/2007 | Elliott et al. |
| 7,536,012 | B1 | 5/2009 | Meyers et al. |

| 2002/0025041 | A1* | 2/2002 | Tomita ......................... 380/256 |
| 2005/0157875 | A1* | 7/2005 | Nishioka et al. ................ 380/46 |
| 2005/0250651 | A1 | 11/2005 | Amin et al. |

OTHER PUBLICATIONS

Feynman, "Simulating Physics With Computers," International Journal of Theoretical Physics, 21:467-488 (1982).
Meyers, et al., "Quntum Communications and Quantum Computing for C4I," Proceedings 2002 Army Science Conference Orlando Florida.
Lee, et al. "Treatment of sound on quantum computers" arXiv:quant-ph/0309018v1 Sep. 1, 2003.
Yepez, J. "Type-II Quantum Computers," International Journal of Modern Physics C, vol. 12, Issue 09, pp. 1273-1284 (2001).

(Continued)

*Primary Examiner* — Danny W Leung
*Assistant Examiner* — Daniel Dobson
(74) *Attorney, Agent, or Firm* — Lawrence E. Anderson

(57) ABSTRACT

A method and system of data transmission; the method comprising: converting data into qubits; transmitting a first qubit; measuring the first qubit at receiver location; determining whether or not to transmit portions of data from a sequential successive qubit based upon the value of the first qubit measured at the receiver location. The system comprising a sender and at least one receiver, the sender comprising: a converter for converting data into qubits; a modulator for modulating a signal based upon the values of the qubits; a transmitter for transmitting the modulated signal to at least one receiver; the at least one receiver comprising: a detector for measuring the value of at least one qubit; a feedback circuit for transmitting the measured value of the at least one qubit to the sender; whereby the transmission of data for each successive qubit is based upon the value measured for the preceding qubit and the sender utilizes only the data for each successive qubits which correlates to the measured value of the preceding qubit.

17 Claims, 12 Drawing Sheets

QUANTUM BINARY TREE – FIRST BRANCH

OTHER PUBLICATIONS

Yepez, J. "Quantum Lattice-Gas Model for the Burgers Equation," Journal of Statistical Physics, vol. 107, Nos. 1/2, Apr. 2002, pp. 203-224.

Yepez, J. "An efficient and accurate quantum algorithm for the Dirac equation," arXiv:quant-ph/0210093v1 Oct. 11, 2002.

Yepez, et al. "An Efficient and Accurate Quantum Lattice-Gas Model for the Many-Body Schroedinger Wave Equation, Computer Physics Communications," Apr. 23, 2001.

Boghosian, B, "Quantum lattice-gas model for the many-particle Schrödinger equation in d dimensions," Phys. Rev. E 57, 54-66 (1998).

Meyer, D., "Quantum computing classical physics,"arXiv:quant-ph/0111069v1(Nov. 12, 2001).

Meyers, R., et al. "Simulation of Quantum Computers," Proc. SPIE, vol. 5161, 142 (2004); doi:10.1117/12.503187 (Feb. 2004).

Long, et al. "Efficient Scheme for Initializing a Quantum Register with an Arbitrary Superposed State," Phys. Rev. A64 (2001) 014303.

J. J. Sakurai "Advanced Quantum Mechanics," pp. 78-84 (1969).

Coppersmith, D. "An approximate Fourier transform useful in quantum factoring," arXiv:quant-ph/0201067v1 (Jan. 2002).

Griffiths, et al. "Semiclassical Fourier Transform for Quantum Computation," Phys. Rev. Letters, vol. 76, No. 17, pp. 3228-3231 (Apr. 22, 1996).

\* cited by examiner

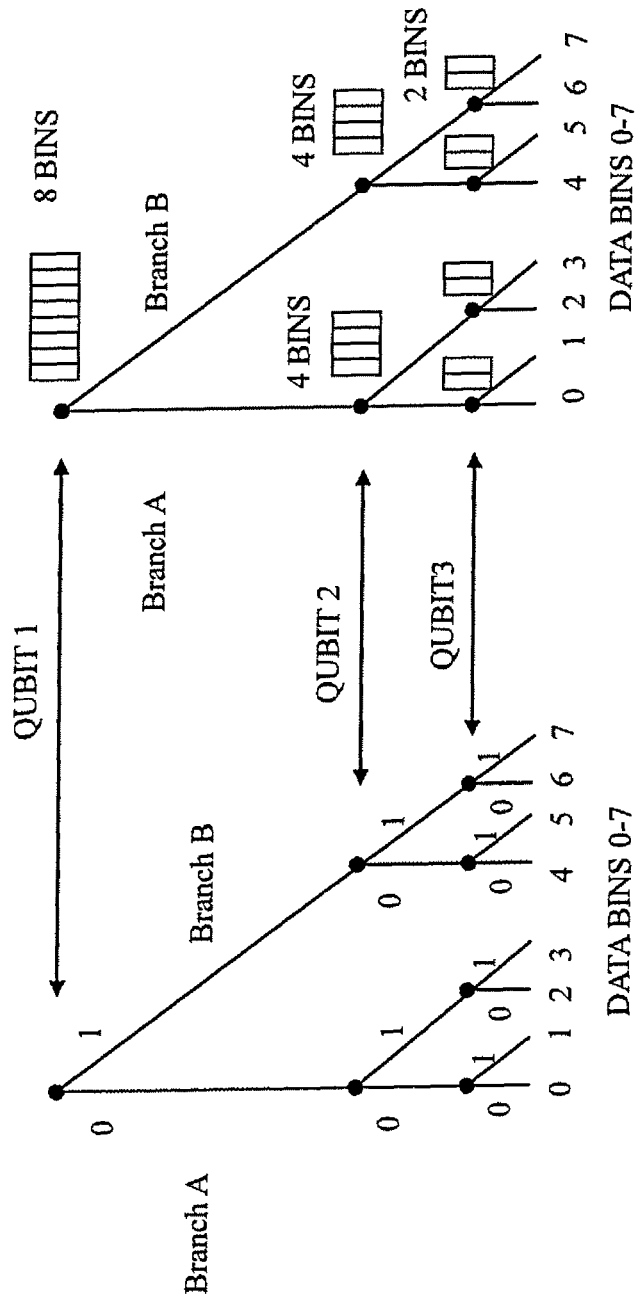
FIG. 1 QUANTUM BINARY TREE

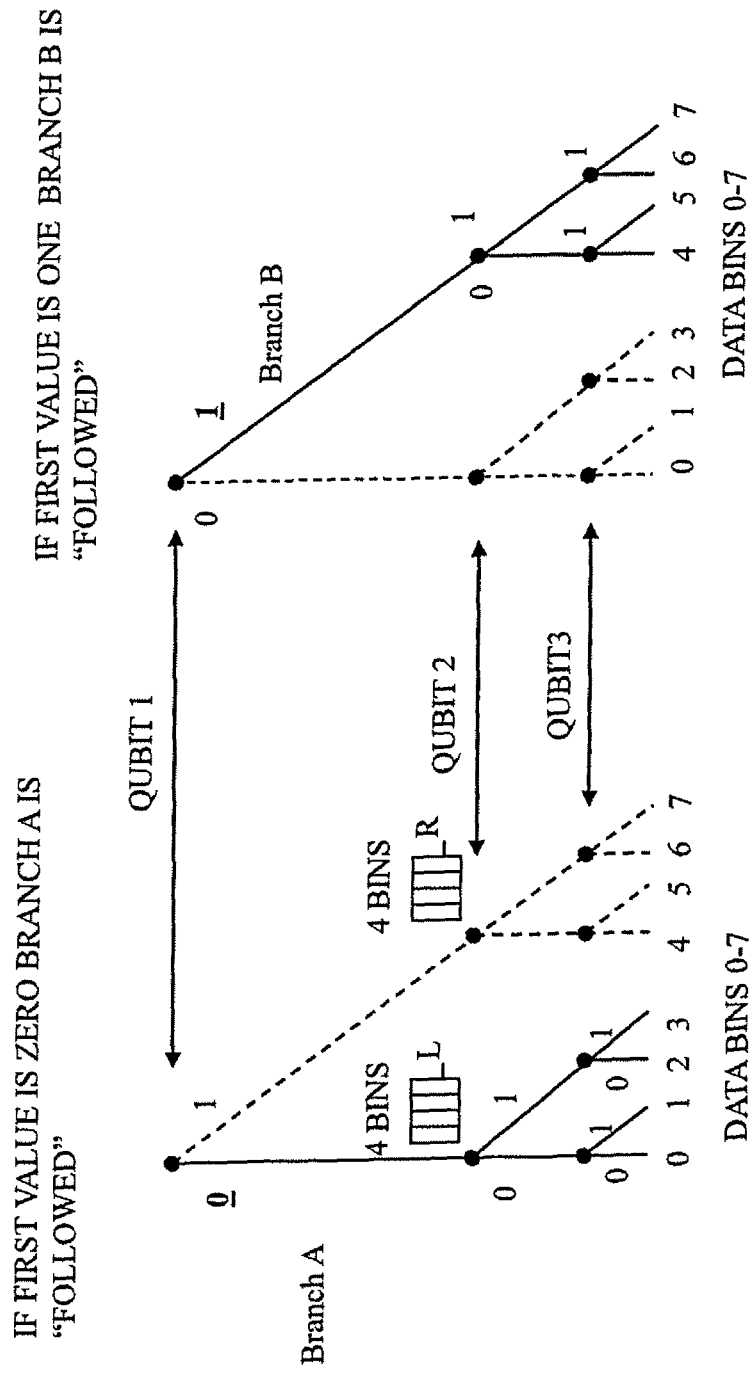
FIG. 1A QUANTUM BINARY TREE – FIRST BRANCH

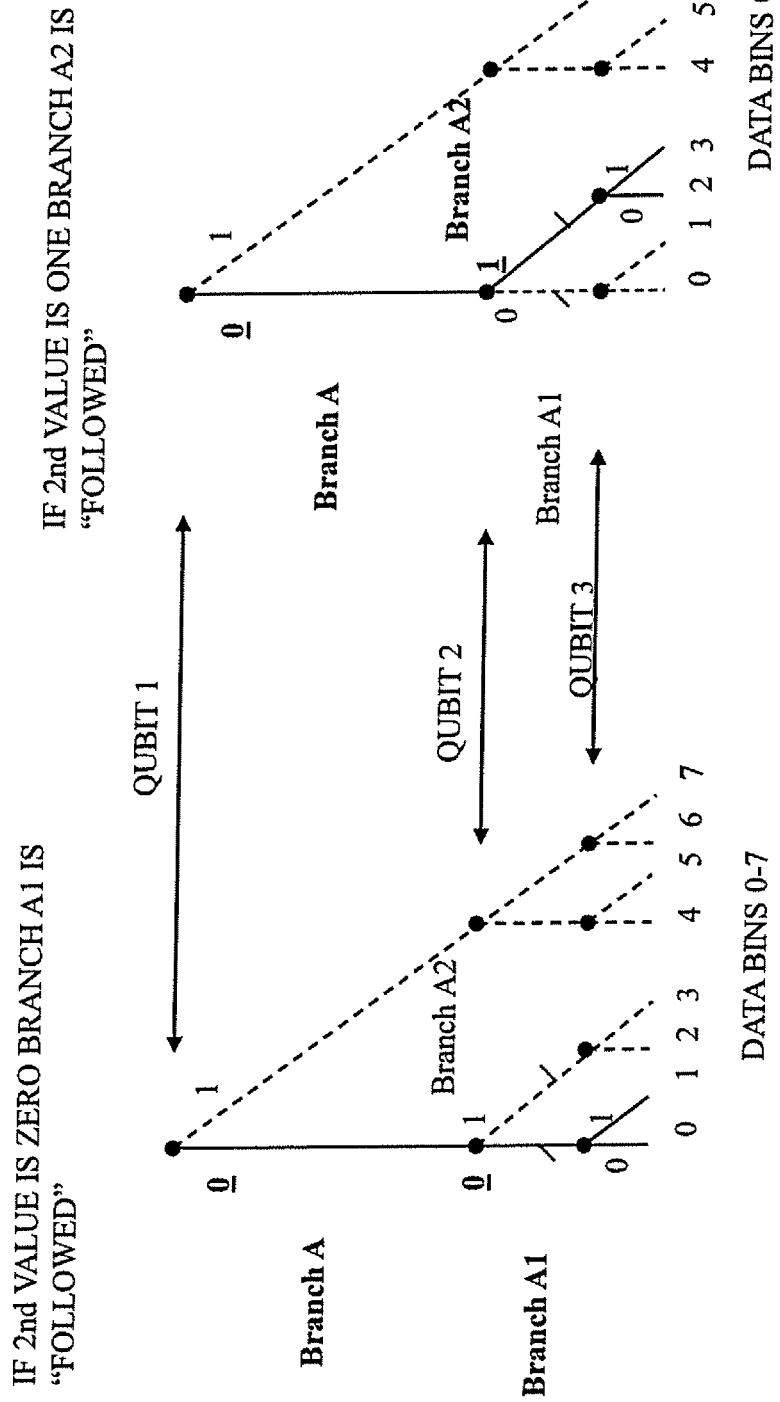
FIG. 1B QUANTUM BINARY TREE – SECOND BRANCH
(FIRST BRANCH VALUE IS ZERO)

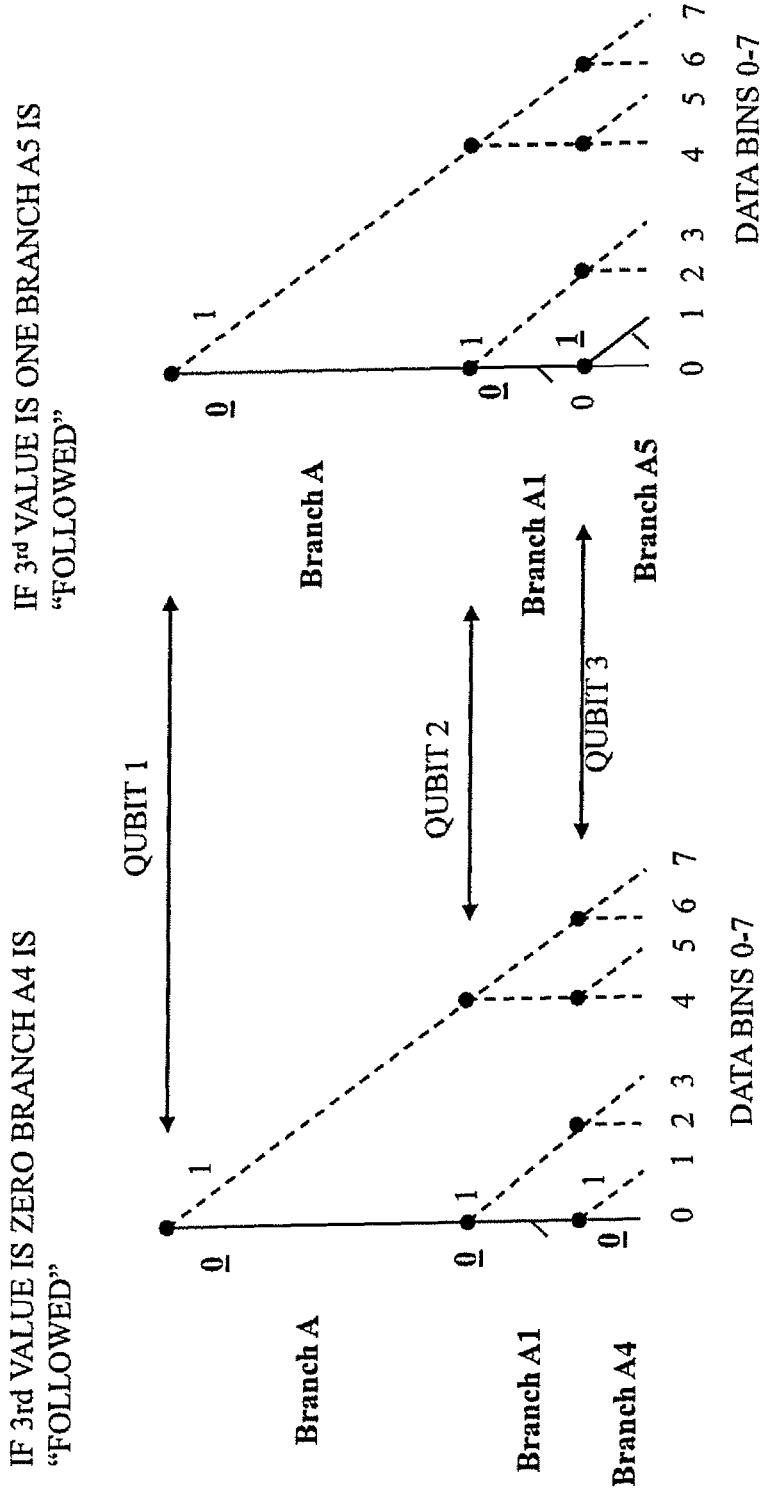
FIG. 1C QUANTUM BINARY TREE – THIRD BRANCH
(FIRST AND SECOND BRANCH VALUES ARE ZERO)

QUANTUM BASED INFORMATION TRANSMISSION SYSTEM AND METHOD

RELATED APPLICATIONS

This application claims priority of U.S. Nonprovisional application Ser. No. 11/196,738, filed Aug. 4, 2005, which issued as U.S. Pat. No. 7,660,533 on Feb. 9, 2010, and U.S. Provisional Patent Application Ser. No. 60/598,537 filed Aug. 4, 2004, both of which are incorporated herein by reference.

GOVERNMENT INTEREST

The invention described herein may be manufactured, used, and licensed by or for the United States Government.

FIELD OF THE INVENTION

This invention relates in general to methods and apparatus for processing, compression, and transmission of data based upon quantum properties and in particular to high density transmission of data.

BACKGROUND OF THE INVENTION

Quantum computing represents a revolutionary frontier technology undergoing intense development. Quantum computing for example, may render classically intractable computations feasible. In spite of theoretical calculations showing enormous efficiency increases for quantum computers relative to classical computers, such improvements have made slow progress. Yet, the societal implications of data compression and transmission based on quantum computing algorithms are considerable. Transmission of voice, image, video and holographic signals in a lossy, extremely highly compressed format would impact nearly every field of human endeavor. As the usage of cell phones, television signals and internet communications crowds the bandwidth available, there exists a need for compression of data communications.

Quantum communication involves qubits, which are quantum bits or units of quantum information. A qubit may be visualized by a state vector in a two-level quantum-mechanical system. Unlike a classical bit, which can have the value of zero or one, a qubit can have the values of zero or one, or a superposition of both. A qubit may be measured in basis states (or vectors) and a conventional Dirac is used to represent the quantum state values of zero and one herein, as for example, $|0\rangle$ and $|1\rangle$. The "pure" qubit state is a linear superposition of those two states can be represented as combination of $|0\rangle$ and $|1\rangle$ or $q_k = A_k|0\rangle + B_k|1\rangle$, or in generalized form as $A_n|0\rangle$ and $B_n|1\rangle$ where $A_n$ and $B_n$ represent the corresponding probability amplitudes and $A_n^2 + B_n^2 = 1$. Unlike classical bits, a qubit can exhibit quantum properties such as quantum entanglement, which allows for higher correlation than that possible in classical systems. When entangled photon pairs are split, the determination of the state (such as polarization or angular momentum) of one of the entangled photons in effect determines the state of the other of the entangled photon pair; since entangle photon pairs are the conjugates of one another. An example of a visualization of a series of qubits is depicted in FIG. 1; a schematic depicting a prior art three qubit quantum binary tree to illustrate an information storage index space equivalency to eight classical bits. The quantum binary tree of FIG. 1 is depicted for 3 qubits which provides an index space of 8.

SUMMARY OF THE INVENTION

The present inventive method allows for the transmission of information over a path wherein the data or information is first converted to qubits. A quantum tree formed of qubits is depicted in FIGS. 1, 1A, 1B and 1C. In the example shown, 3 qubits are used. However, the number of qubits may be changed without departing from the scope and principles of the present invention. As the first qubit is transmitted, a measurement takes place and the result is inputted into computer 207, illustrated in FIG. 2, et seq. Based upon this measurement, as illustrated by the decision tree of FIG. 1A, either the left (L) or right (R) portion of qubit 2 is not used (or transmitted). Following the transmission of the portion of qubit 2, another measurement takes place and the result is inputted into computer 207. Based upon this measurement, as illustrated by the decision tree of FIG. 1B, either branch A1 or A2 is followed. In the example shown in FIG. 1C, where the first and second measured values were zeroes, the qubit portions represented by the nodes at the dotted line branches are unused and not transmitted.

Due to the properties of the qubits, a preferred embodiment system employs the quantum Fourier transform (QFT) and a classical or quantum inverse Fourier transform in the measurement process. Data inputted in the form of a wave function, generated using, for example, amplitudes of a given signal, is converted into a quantum state or qubits over which, in a preferred embodiment of the present invention, transforms, such as the quantum Fourier transform (QFT), operate. The conversion of the wave function to a quantum state represented by qubits is described, for example, in GuiLong, Yang Sun; "Efficient scheme for initializing a quantum register with an arbitrary superposed state," Physical Review A, Volume 64, 014303, hereby incorporated by reference). The quantum Fourier transform is implemented by a series of optical elements implementing quantum operations followed by a measurement as described for example, in Robert B. Griffiths, et al. "Semiclassical Fourier Transform for Quantum Computation," Physical Review Letters, Apr. 22, 1996, hereby incorporated by reference). Although a particular embodiment is described, other equivalent formulations, processes, and configurations are encompassed within the scope of the invention.

In terms of data flow, a preferred methodology comprises splitting a wave function representative of an input data set into an arbitrarily oriented elliptical polarization state and a comparator wave function state, the comparator wave function state being transmitted to a detector. In a preferred embodiment, a quantum Fourier transform is performed on the arbitrarily oriented elliptical polarization state to yield a quantum computational product. A quantum Hadamard transform is performed on the quantum computational product to yield one of two possible quantum particle outputs. Through feedback circuitry, the input data set is processed based upon the coincident arrival of the comparator wave function state and one of the two quantum particle outputs. Data compression and transmission in accordance with a preferred embodiment of the present invention may be performed on either a quantum computer or a digital computer.

A data communication system operating on quantum computation principles includes a light source having a photon output coding an input data set. A Type-I or Type-II nonlinear crystal converts the photon output into an entangled photon output. An arbitrarily oriented polarization state is assured by passing the entangled photon output through a polarization modulator (44) and a phase modulator (46). A polarization interferometer (122) performs a controlled phase shift transform on the arbitrarily oriented polarization state as an interferometer output. A halfwave plate then performs a quantum Hadamard gate transform to generate one of two possible photon states from the interferometer output thus completing the operations required for a quantum Fourier transform. Coincidence electronics reconstruct the input data set a distance from the light source. The reconstruction is based on the coincident arrival of the one of two possible photon states and at least one of the entangled photon output or the interferometer output. The result is then fed back via computer 207 and associated circuitry whereupon the computer 207 in conjunction with polarization modulator (44) and a phase modulator (46), based upon the "branch" determinations, processes only portions of the succeeding qubits, resulting in reduction in the amount of data which is transmitted.

BRIEF DESCRIPTION OF THE DRAWINGS

FIG. 1 is a schematic depicting a three qubit quantum binary tree to illustrate an information storage index space equivalency to eight classical bins.

FIG. 1A is schematic depiction of the first level branching of the three qubit quantum binary tree of FIG. 1

FIG. 1B is schematic depiction of the second level branching of the three qubit quantum binary tree of FIG. 1

FIG. 1C is schematic depiction of the third level branching of the three qubit quantum binary tree of FIG. 1.

DETAILED DESCRIPTION OF THE PREFERRED EMBODIMENTS

The present invention has utility in data transmission. A quantum computing algorithm for processing data has greater than classical efficiency when run on a quantum computer. It is appreciated that an embodiment of the present invention comprises a method for data compression and transmission that is operative in a classical digital computing environment although without the superior speed and information storage properties of qubits that are realized on a quantum computer. While the present invention is hereafter detailed in the context of sound compression and transmission, it is appreciated that data corresponding to any number of media are equally well suited for transmission in a highly compressed and lossy manner, such as light transmission. Data set types other than sound readily transmitted according to the present invention illustratively include images, video, holograms, digital instrument output and numerical streams.

A preferred embodiment of the present invention includes a system for the transmission and reconstruction of a data set through the utilization of a quantum Fourier transform (QFT) operation on qubits coding the data set.

A preferred embodiment of the present invention prepares a wave function in a n data set; as described for example in Long and Sun; "Efficient scheme for initializing a quantum register with an arbitrary superposed state, "Physical Review A, vol. 64, Issue 1, 014303 (2001) (hereinafter "Long and Sun"). In "Long and Sun," a scheme is presented that can most generally initialize a quantum register with an arbitrary superposition of basis states as a step in quantum computation and quantum information processing. For example, "Long and Sun" went beyond a simple quantum state such as $|i_1, i_2 i_3, \ldots i_n\rangle$ with $i_j$ being either 0 or 1, to construct an arbitrary superposed quantum state. "Long and Sun" utilize the implementation of $O(Nn^2)$ standard 1- and 2-bit gate operations, without introducing additional quantum bits. The terminology arbitrary superposed quantum state as used herein correlates to the construction of an arbitrary superposed quantum state as described, inter glia, in "Long and Sun."

Figure 2:
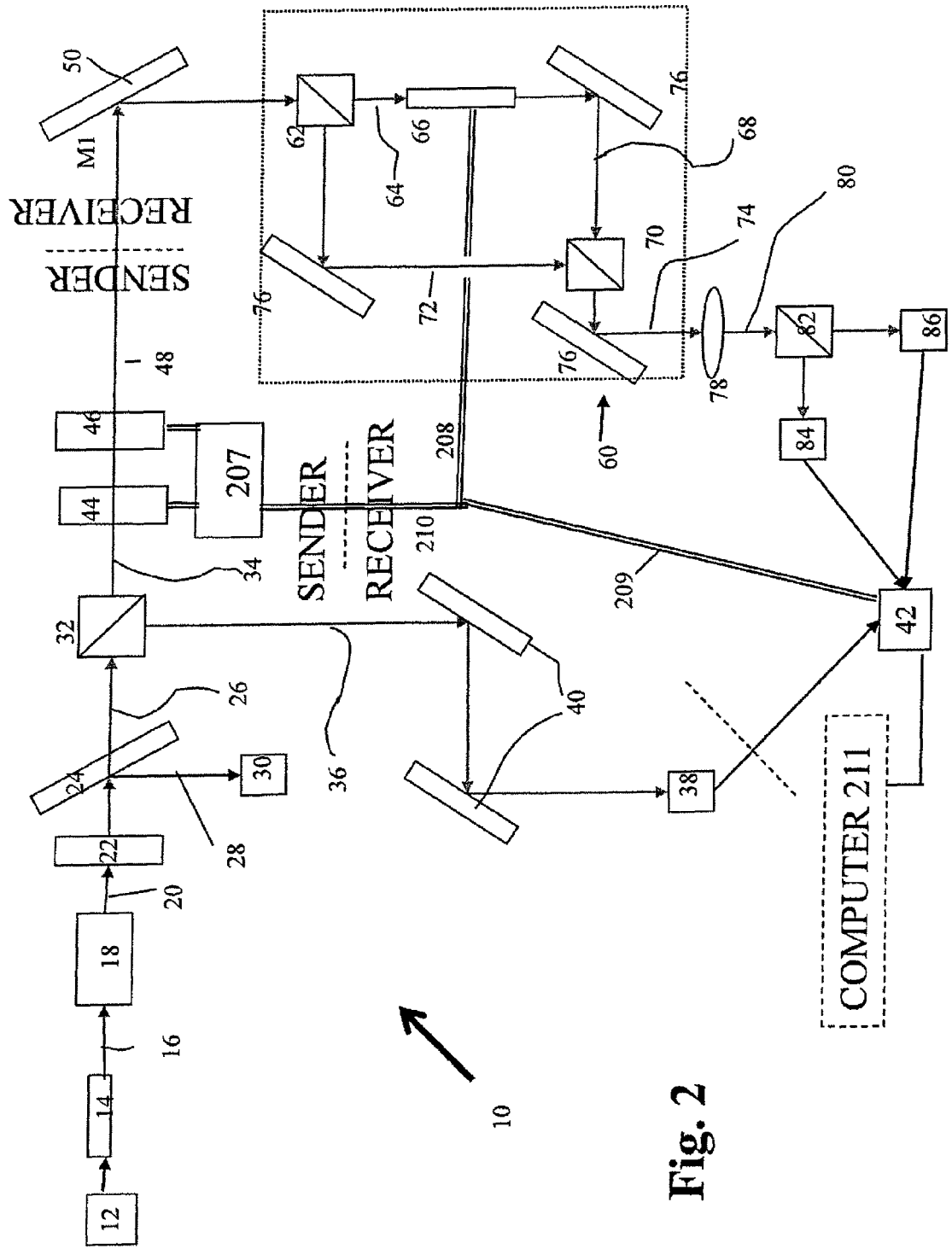
FIG. 2 is a schematic of an optical bench configured as a quantum computer system according to the present invention using a Type-II nonlinear optics crystal and a polarization Mach-Zehnder interferometer to perform a quantum Fourier transform (QFT)

As depicted in FIG. 2, a series of optical elements are provided to act as quantum operators followed by a measurement to implement the quantum Fourier transform. R. B. Griffiths, C.-S. Niu; *Physical Review Letters* 76, 3328-3231 (1996). An optical bench with appropriate electronics is well suited to function as a quantum computer for the compression and transmission of data corresponding to sound. Those of ordinary skill in the art can appreciate that although an optical bench is described as the platform for generating and performing operations on qubits, it is appreciated that three plus qubit quantum computers are known to the art based on ion trapping and the nuclear magnetic resonance spectrometer.

An inventive quantum computing system has been developed for data processing. The data set amplitudes, such as sound amplitudes, are represented by a quantum wave function. The wave function is in turn coded into the qubits of quantum particles. Preferably, the quantum particles are photons, but trapped ions or magnetic spin states can also be utilized to practice the principles of the present invention.

In the practice of the present invention on a classical computer, the data series, that for illustrative purposes is a sound, is broken into a series of segments each represented by the number of qubits that the classical computer can store and compute. In a quantum computer, the quantum particles, preferably photons, are operated on by optical components to perform the inventive method steps.

The method of the present invention relies on the use of qubits in a quantum computer or the simulation of qubits in a classical computer. Qubits comprise superpositions of ones and zeros where both simultaneously exist. Photons that define the wave function are subjected to a quantum Fourier transform operation. In the process, the photons are measured thereby destroying the quantum state, but providing the measured probability in terms of the wave function and its complex conjugate $$P = \psi \psi^*. \tag{1}$$

An inverse Fourier transform (FT) is then applied to the square root of the measured probability to recover a lossy intelligible data compression in the form of quantum particle detection. It is appreciated that the inverse Fourier transform may be either a classical or quantum transform. A classical fast Fourier transform is readily performed by optical bench elements or through a classical computer program. The forward and inverse transforms are conducted using a relatively small sample of the wave function Fourier modes which has the property of preserving much of the intelligibility of the data while providing a compression and communication efficiency. Using the quantum computing simulation of a classical computer according to the present invention, a sound data set (for example) is intelligibly reproduced with a lossy compression factor over a classical computation. Computational efficiency with the present invention increases in the case of an increasing set of qubits. In practice, the inventive method allows for the transmission of information over a long path using a small number of photons. Data transmission with a small number of photons carrying the data in a quantum particle form is amenable to free optical path transmission through air or vacuum, through optical fibers and via satellite transmission. As a result, a first location remote from a second location is retained in communication therebetween with the transmission of a comparatively small number of qubits of quantum particles relative to the data exchanged. Photons are amenable to transit in an environment exposed to climactic weather between the locations. It is appreciated that co-linear transmission of a comparator wave function state and an information carrying state facilitates long-range data transmission.

State Preparation

According to the present invention, a data set is modeled by, or in the form of, a wave function. By way of example, a sound is characterized by intensity amplitudes at uniformly spaced intervals $$\alpha_i = \alpha(t_i) \tag{2}$$

where $$t_i = t_0 + \sum_{j=1}^{i} \Delta t_j. \tag{3}$$

A superimposed quantum form is applied to the sound data set to facilitate quantum computer manipulation. To accomplish the quantification, data amplitudes are equated to a wave function in the form of a series $$\psi = \sum_{i=0}^{2^N-1} \alpha_i |i\rangle \tag{4}$$

where $$|i\rangle \tag{5}$$

is the quantum state key. The qubits are characterized as the quantum state superpositions $$q_k = A_k |0\rangle + B_k |1\rangle. \tag{6}$$

A quantum probability conservation condition is imposed such that $$A_n^2 + B_n^2 = 1. \tag{7}$$

To account for the quantum superposition, the quantum data is organized in terms of a conventional quantum binary tree. A prior art quantum binary tree is depicted as a branching between 0 and 1 outcomes for successive steps in FIG. 1. Using the qubit representation shown in FIG. 1, the first step is to determine whether a one or zero exists at the first branch located at the top of the triangle depicted in FIG. 1A. If a zero value is present, Branch A is followed and the right side of the triangle or the "Branch B" becomes unnecessary to future determinations. Elimination of the "B Branch" results in data compression. FIG. 1B is a depiction of the second level branching following the determination depicted to the left in FIG. 1A. If the value is zero, Branch A1 is followed. If the value is one, Branch A2 is followed. In each case, the other branch is eliminated resulting in data compression. FIG. 1C is a depiction of the third level branching following the determination depicted to the left in FIG. 1B. If the value is zero, Branch A4 is followed. If the value is one, Branch A5 is followed. In each case, the other branch is eliminated resulting in further data compression. The particular values selected for depiction in FIGS. 1B and 1C are merely exemplary. Results a "one" determination at first level are not shown in FIG. 1B to make the diagram easier to follow. Results of a "one" determination at the second level are not shown in FIG. 1C to make the diagram easier to follow.

The outcomes of the successive steps sum to the values 0 through $2^n-1$, where n is the number of qubits. The means of obtaining the 0 or 1 depends on the specific experimental and corresponding simulation implementation. There are several conventional rules that are possible for determining the 0 or 1 value. For example, a 0 state may correspond to a horizontal measurement and the 1 may correspond to a vertical measurement, or the reverse may be true. In general, the series of qubit measurements are prepared such that each value of the state preparation is conditioned to determine the 0 or 1 at each branch. An alternate qubit architecture operative herein is termed "winner take all." In the simulation depicted in FIG. 1, n qubit measurements are made. The n value is determinative of the first branch. The $2^n$ are divided into two parts, lower 0 to $((2^n/2)-1$ and higher indices $((2^n/2)$ to $2^n-1$. The side with the greatest sum of the indices measured determines the path of the first branch. The second level branch has one half the number of indices of the first branch. Consecutive indices assigned are from the selected half from the first branch. The same process is used for the second branch level as from the first branch, but with half of the indices. This process repeats until all the branching is determined and the selected single index is determined. The quantum binary tree depicted in prior art FIG. 1 for three qubits provides an index space of eight. The quantum binary tree is expandable to n qubits which is equivalent to an index space of $2^n$ over which transforms, such as the QFT operate.

The quantum superposition amplitudes at any qubit level in the binary tree may be constructed from sound amplitudes $$A_k = \sum_{i=0}^{i=\frac{2^{n_k}}{2}-1} \alpha_1 \tag{8}$$

where the summation is over the number of states $$n_k \tag{9}$$

at each level of the quantum binary tree. Similarly $$B_k = \sum_{i=\frac{2^{n_k}}{2}}^{i=2^{n_k}-1} \alpha_1. \tag{10}$$

The amplitudes α are approximated in the quantum computation by identification with probabilities which can then be sampled. For one realization, it is noted that $$\alpha_0 = \prod_{i=0}^{i=2^n k - 1} A_i \quad (11)$$

and $$\alpha_k = \prod_{i=0}^{i=2^n k - 1 - j} \prod_{j=0}^{j=i} A_i B_j. \quad (12)$$

The classical index k is given in terms of the quantum qubit indices n of the quantum binary tree made of n qubits $$k = \sum_{i=0}^{i=n-1} (2^{n-i}) \langle |q_1| \rangle. \quad (13)$$

The term $$\langle |q_i| \rangle \quad (14)$$

represents the measurement of the $i^{th}$ qubit, registering as a 0 or 1.

Quantum Data Simulation

Superpositions of qubits are used to store and process data such as sound. The amplitude of the "data" can be stored as the amplitudes of a superposed quantum state $$\omega = \Sigma \alpha_i |k\rangle_i. \quad (15)$$

where |k⟩ is the eigenstate of Ψ. The term ⊗ can be decomposed as a direct product of qubits $$|q\rangle_1 \otimes |q\rangle_2 \otimes \ldots \otimes |q\rangle_n \quad (16)$$

which compacts storage requirements by a factor of log 2 relative to a classical computation. A data set of size $2^n$ can be stored and operated on in n quantum bits. Mathematical transforms can also be performed on the quantum stored signal with the associated computational savings.

Quantum Computational System

According to the present invention, data compression and transmission are preferably performed using photons as quantum particle qubits. Various system configurations are depicted in accompanying FIGS. 2-7 where like numerals described with reference to subsequent figures correspond to previously detailed elements.

Referring now to FIG. 2, an inventive system is depicted generally at 10. A data encoder 12 converts the data set to a set of photonic qubits that satisfies the expression of Equation 15 and triggers a light source 14 accordingly. Preferably, the light source 14 is a laser. Exemplary lasers operative herein illustratively include Nd:YAG, ion lasers, diode lasers, excimer lasers, dye lasers, and frequency modified lasers. Photons 16 emitted from the light source 14 are optionally passed through a spatial filter 18. Filter 18 converts the photons 16 in an image space domain to a spatial frequency domain and serves the purpose of removing, for example, stripe noise of low frequency and/or high frequency noise. The noise associated with system fluctuations illustratively including line noise powering the light source 14, thermal gradients, detector noise, and inherent quantum noise. The photons 20 having passed through spatial filter 18 are then passed through a Type-II nonlinear optics crystal 22. Type-II nonlinear optic crystals are well known to the art and illustratively include potassium dihydrogen phosphate, potassium titanyl phosphate, beta-barium borate, cesium lithium borate and adamantyl amino nitro pyridine. A dichroic mirror 24 is used to selectively reflect out of the beam path 26 those photons 28 that have changed wavelength as a result of passing through the crystal 22. A beam stop 30 blocks the path of photons 28. The entangled photons 26 are split by interaction with a polarization beam splitter 32. The entangled photons 26 are split into a known photon state 34 and a comparator wave function state 36. The comparator wave function state 36 is directed onto a single photon counting module 38 by an optional mirror set 40. It is appreciated that a reorganization of beam paths in the system 10 obviates the need for mirror set 40. The detection of the comparator wave function state 36 by the single photon counting module 38 is fed to coincidence electronics 42 and is used to reconstruct the data set. The known photon state 34 is then passed through a polarization modulator 44 and a phase modulator 46. Exemplary polarization phase modulators illustratively include liquid crystals, Kerr cells, and Pockel cells. Preferably, a series of two liquid crystal devices and a quarter wave plate are used to achieve arbitrary polarization. Upon the known photon state 34 interacting with the polarization and phase modulators 44 and 46, respectively, the known photon state 34 is transformed into an arbitrarily oriented elliptical polarization state 48 based on the data set signal being transformed and any previously measured photon state, if any is known. The arbitrarily oriented elliptical polarization state 48 is optionally reflected from a mirror 50 and then enters a polarization interferometer depicted generally at 60. The interferometer 60 depicted has the geometry of a polarization Mach-Zehnder interferometer and includes a polarization beam splitter 62 that transmits one portion 64 to a phase modulator 66 resulting in a phase shift in the light component 68 reaching polarization beam splitter 70 relative to the other polarization component 72. Polarization beam splitter 70 recombines beam components 68 and 72 to complete a controlled phase shift transform on the recombined state 74 from the interferometer 60. Ancillary mirrors collectively numbered 76 are provided to reflect light in desired directions. The controlled phase shift transformed light component representing a recombined phase state 74 then interacts with a half wave plate oriented at 22.5 degrees 78 in order to implement a quantum Hadamard gate transformation therein and thus complete a quantum Fourier transform. The half wave plate 78 provides a qubit prioritized input 80 to a polarization beam splitter 82.

The process that computes the Quantum Fourier Transform (QFT) of a signal may be described as follows. First, the computer or device that holds the signal divides the signal into a series of sections. Each section contains N samples of the signal. This section of N samples is then used to prepare the first qubit of the quantum state using a prescribed technique for the QFT. This quantum state is then passed though a device that applies a particular phase shift appropriate to this qubit of the QFT. The qubit is then measured and the result of that measurement is recorded as a 0 or 1. This measurement is also used to determine which half of the N samples of the current signal section are used as a subsection to prepare the next qubit, the other half is not needed to prepare the next qubit. This qubit and all the remaining qubits generated for the original signal section are prepared and measured in a similar way with each qubit measurement using only half of the remaining signal subsection to prepare the next qubit. This process ends when the last qubit that is prepared using only 2 samples of the signal section. When all these qubits have been measured for one section we have a binary number that tells us to add 1 to the bin addressed by that binary number, for instance the binary number 010 would indicate address 2 and the binary number 110 would indicate address 6. These steps are repeated a number of times on the same signal section to generate a power spectrum representation of the signal section. Signal processing techniques such as a classical inverse Fourier transform or compressive sensing/sampling can used on this power spectrum to reconstruct the initial signal section in a lossy but still recognizable manner.

In the QFT a number of photons, each with prepared qubit states, are sent sequentially through quantum controlled phase transforms followed by quantum Hadamard transforms. The state preparation is accomplished by setting the values of the phase and setting the photons to particular elliptical polarization values.

The Hadamard transform is a quantum transform operating on one qubit at a time. The Hadamard gate transform is given as $$\begin{pmatrix} 1 & 1 \\ 1 & -1 \end{pmatrix}. \quad (17)$$

The qubits are operated on by the Hadamard transform as $$|q_{n_k}'\rangle = H|q_{n_k}\rangle \quad (18)$$

where $n_k$ is the index of the current qubit state.

Hadamard transforms in the order of the most significant qubit to the least significant qubit.

The initial state of each photon qubit is conditioned on the measured values of each photon that went before.

A single photon is operated upon by a Hadamard transform, with the effect of Hadamard transforms on multiple photons representing an entire wave function is represented by the combined Hadamard transform.

Wave Function Transform

The total wave function made of arbitrary superposed states is operated on by the combined Hadamard transform $$|\psi'\rangle = \hat{H}_{gate}|\psi\rangle \quad (19)$$

where $$\hat{H}_{gate} = H \otimes I \ldots \otimes I. \quad (20)$$

Here the direct product of the identities is repeated until all of the qubits are taken into account.

Single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement. The probability density function is defined by $$P = \psi\psi^* \quad (21)$$

and sets the number of times on the average that a photon lands in an indexed space interval. For n qubits there are $2^n$ indexed space intervals.

A determination as to the polarization of each photon is provided by signal measurement at one of the single photon counting modules 84 and 86. The polarization of each photon is measured at the end of the photon path through the Hadamard gate and electro-optics. If horizontal (0) then no phase operations applies to the remaining qubits. Otherwise, a controlled phase operation $R_m$ is applied to remaining operations. The $R_m$ set is defined as $$R_m = \begin{pmatrix} 1 & 0 \\ 0 & e^{\frac{i\pi}{2^{\Delta n}}} \end{pmatrix}. \quad (22)$$

The term $\Delta n$ represents the distance between the $n_k$ indices of the binary tree levels under consideration, $$\Delta n = n_k - n_{k'} \quad (23)$$

The output of an inventive system is provided to a buffer store. From the buffer store it may be provided to an output device on either a real-time or delayed basis as still images, video images, movies, audio sound representations, and the like.

Figure 3:
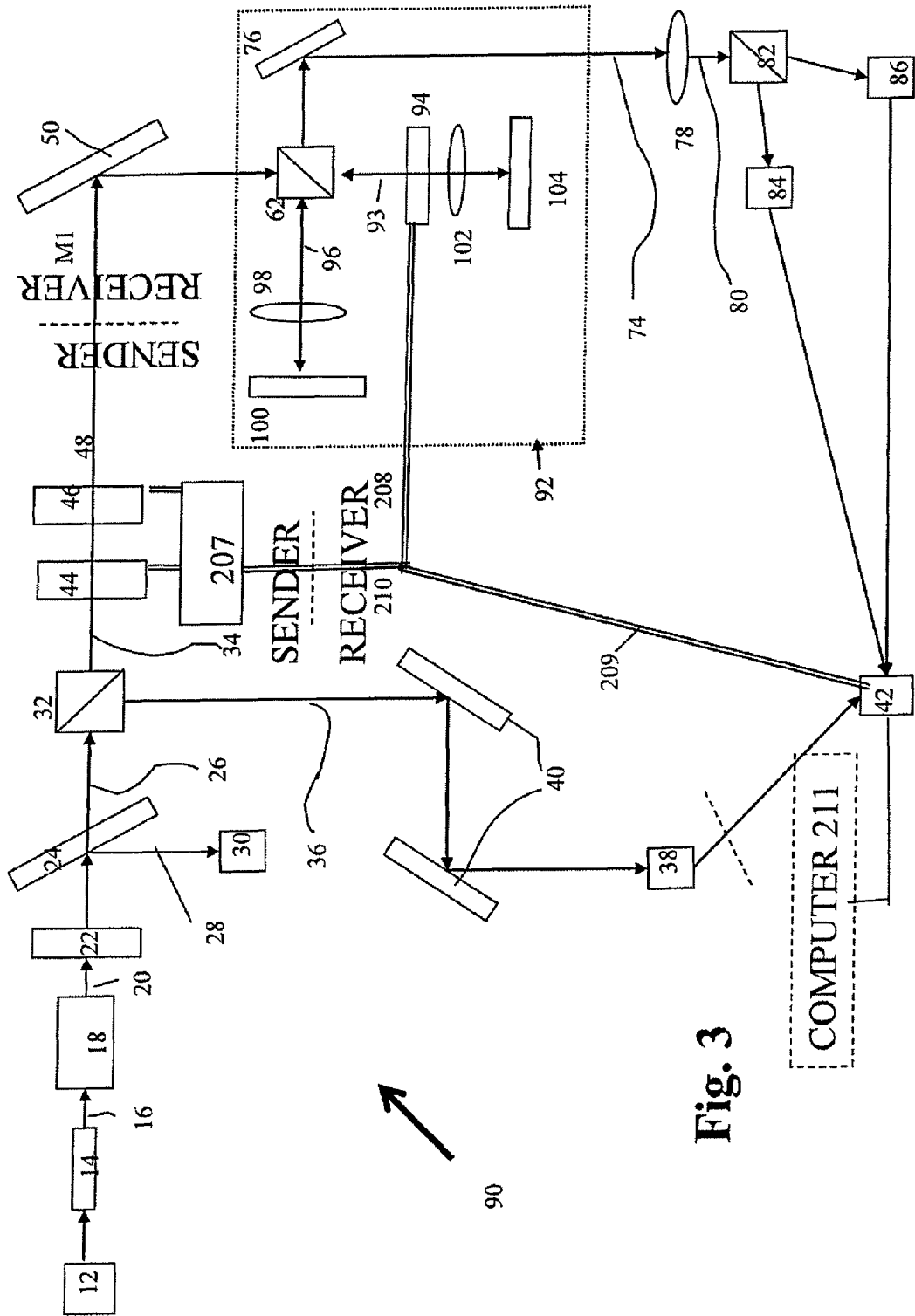
FIG. 3 is a schematic of an optical bench configured as a quantum computer system according to the present invention using a Type-II nonlinear optics crystal and a polarization Mickelsen interferometer to perform a QFT.

Referring now to FIG. 3 where an inventive system is depicted generally at 90, the system 90 has numerous features in common with that system depicted in FIG. 2 and such attributes share like numerals with those detailed with respect to FIG. 2. In contrast to system 10 depicted in FIG. 2, the system 90 includes an interferometer shown generally at 92 that has the geometry of a polarization Mickelsen interferometer. The interferometer 92 receives an arbitrarily oriented elliptical polarization state 48 incident on a polarization beam splitter 62 that splits the arbitrarily oriented elliptical polarization state 48 with one component of the polarization 93 phase shifted at phase modulator 94 relative to the other polarization component 96. The polarization component 96 interacts with a quarter wave plate 98 rotating polarization by 90 degrees. Phase component 96 is then reflected from mirror 100 back to polarization beam splitter 62 where the phase component 96 is recombined with phase shifted polarization component 93 that has passed through polarization modulator 94, a quarter wave plate 102 rotating the polarization by 90 degrees and returning to polarization beam splitter through reflection from translating mirror 104. It is appreciated that the phase modulator 94 is readily removed and the phase difference applied to phase shifted polarization component 93 is imparted by the translating mirror 104. Regardless of the specific components of interferometer 92, the recombined state 74 is reflected off mirror 76 and further manipulated as detailed with respect to FIG. 2 such that a valid probability density function measurement is only counted upon coincidence between photon detection at modules 38 and 84, or between modules 38 and 86.

Figure 4:
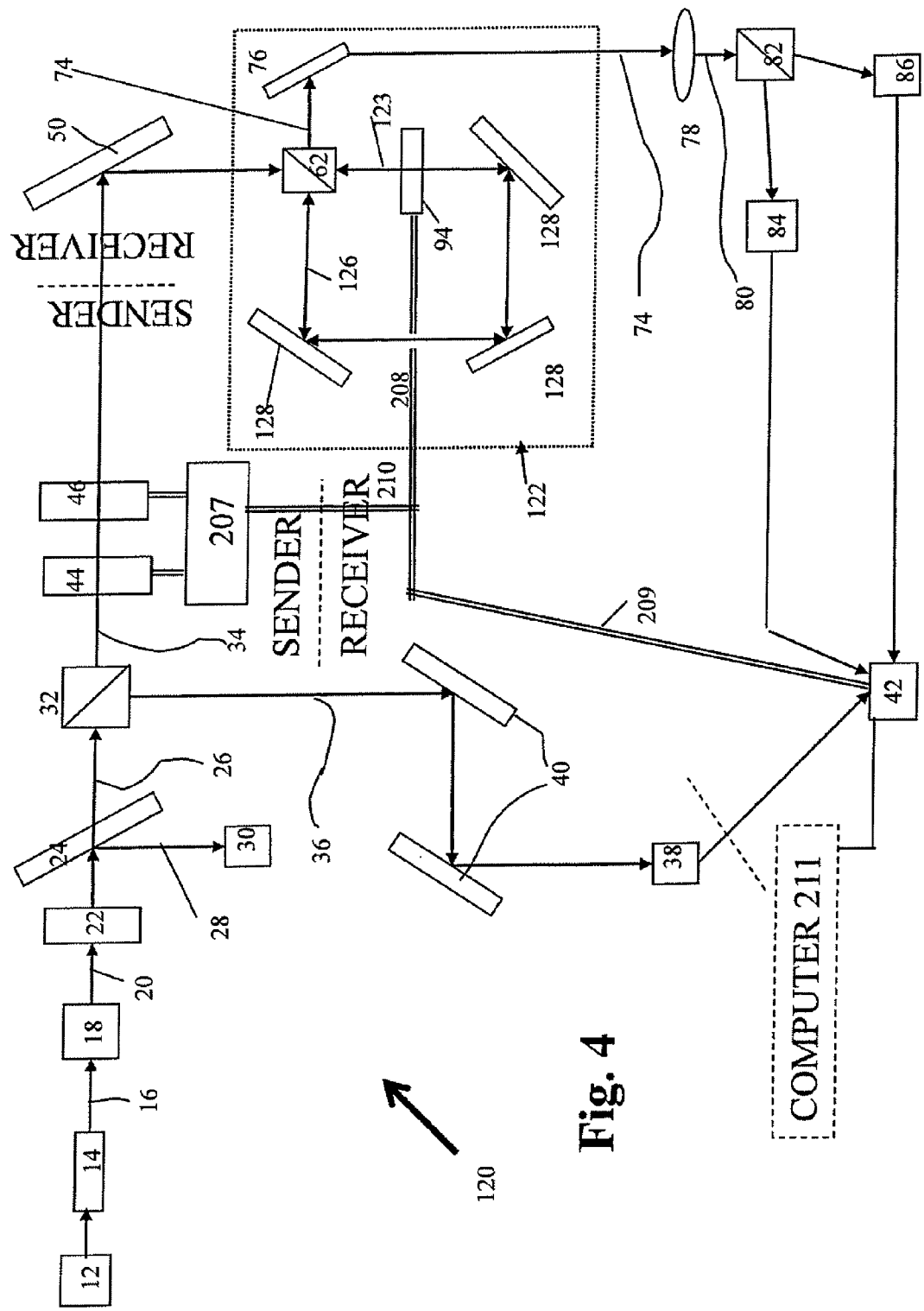
FIG. 4 is a schematic of an optical bench configured as a quantum computer system according to the present invention using a Type-II nonlinear optics crystal and a polarization Sagnac interferometer to perform a QFT.

Referring now to FIG. 4, an inventive system is depicted generally at 120, the system 120 has numerous features in common with that system depicted in FIG. 2 and such attributes share like numerals with those detailed with respect to FIG. 2. In contrast to system 10 depicted in FIG. 2, the system 120 includes an interferometer shown generally at 122 that has the geometry of a polarization Sagnac interferometer. The arbitrarily oriented elliptical polarization state 48 is split at polarization beam splitter 62 to phase shift a polarization component 123 through interaction with a phase modulator 94. A second component 126 is recombined with the phase shifted component 123 through coincidental reflection with the mirrors collectively labeled 128. The recombined state 74 is reflected by mirror 76 onto a half wave plate 78 to implement a quantum Hadamard gate transformation.

Single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement.

Figure 5:
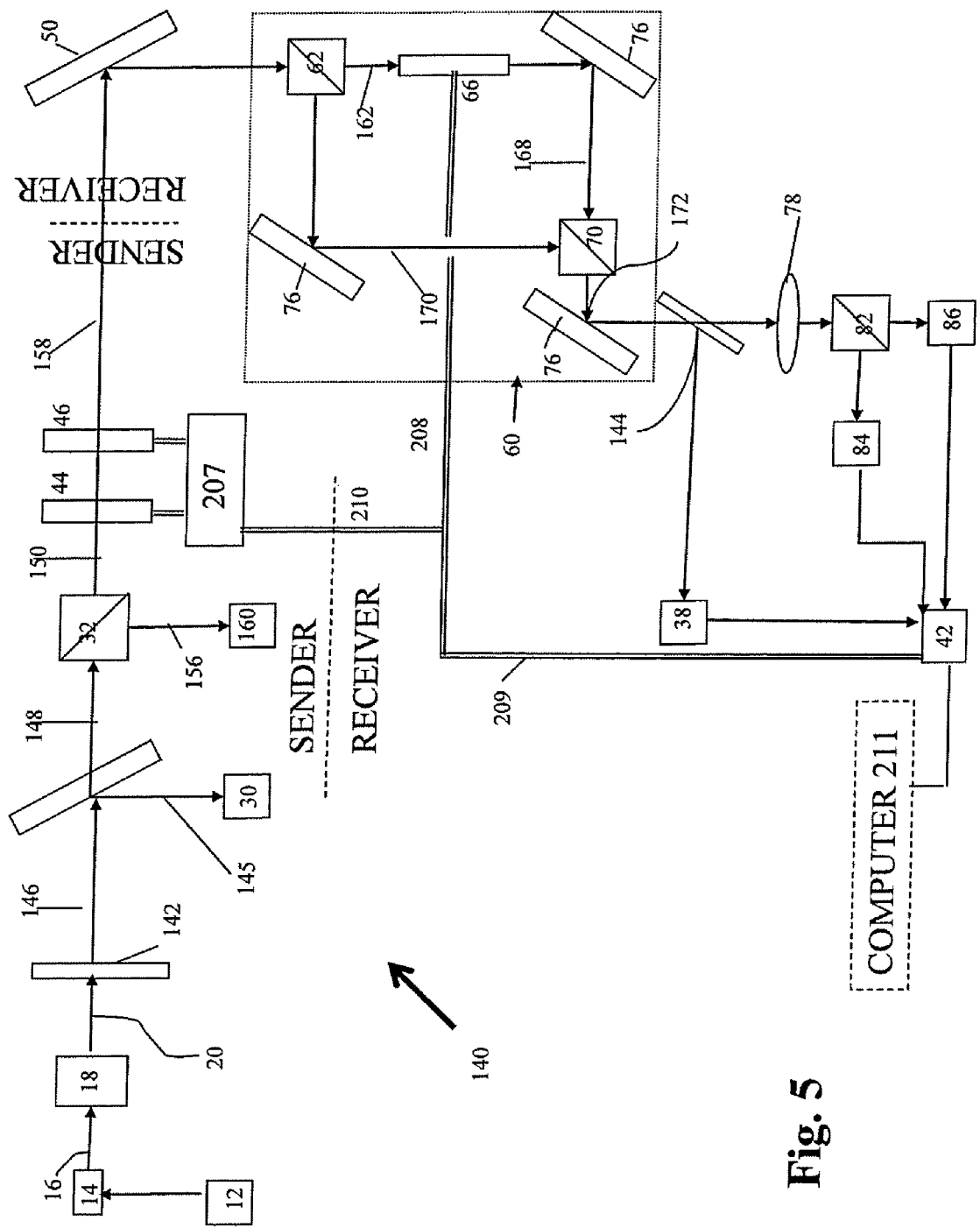
FIG. 5 is a schematic of an optical bench configured as a quantum computer system according to the present invention using a Type-I nonlinear optics crystal and a polarization Mach-Zehnder interferometer to perform a QFT.

Referring now to FIG. 5, an inventive system is depicted generally at 140 that is a Type-I nonlinear optics crystal analog in the system 10 depicted with reference to FIG. 2, where like numerals used with reference to FIG. 5 correspond to the description of those previously provided with respect to FIG. 2. A Type-I nonlinear crystal 142 generates entangled photon pairs with the same known polarization from photons 20. Type-I nonlinear optical crystals operative herein illustratively include beta-barium borate, potassium niobate, lithium triborate and cesium lithium borate. Preferably, the crystal 142 is tuned for non-degenerative down conversion with regard to dichroic mirror 144. The entangled photon pair with same known polarization 146 is separated from frequency shifted components 145 that are in turn terminated at beam stop 30. The monochromatic known polarization beam 148 is incident on polarization beam splitter 32 and that component with a known photon state 150 is directed through a polarization modulator 44, a phase modulator 46 to yield an arbitrarily oriented polarization state 158 that is optionally reflected off mirror 50 and into interferometer 60 that has the geometry of a polarization Mach-Zehnder interferometer. Second photon state 156 is directed onto beam stop 160. The arbitrarily oriented elliptical polarization state 158 retains characteristics of the data set signal to be subsequently transformed in any previously measured photon state, if such is known. The interferometer 60 depicted has the geometry of a polarization Mach-Zehnder interferometer and includes a polarization beam splitter 62 that transmits one portion 162 to a phase modulator 66 resulting in a phase shift in the light component 168 reaching polarization beam splitter 70 relative to the other polarization component 170. Polarization beam splitter 70 recombines beam components 168 and 170 to complete a quantum Fourier transform on the recombined state 172 from the interferometer 60. Ancillary mirrors collectively number 76 are provided to reflect light in desired directions. The recombined state 172 is such that one of the photons of an entangled photon pair is reflected by dichroic mirror 144 to single photon counting module 38 while the other photon of the entangled photon pair will be transmitted onto the half wave plate 78.

Single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement. It is appreciated that a co-linear transmission of the combined state 172 or the arbitrarily oriented polarization state is well suited for remote transmission between the light source 14 and coincidence electronics 42.

Figure 6:
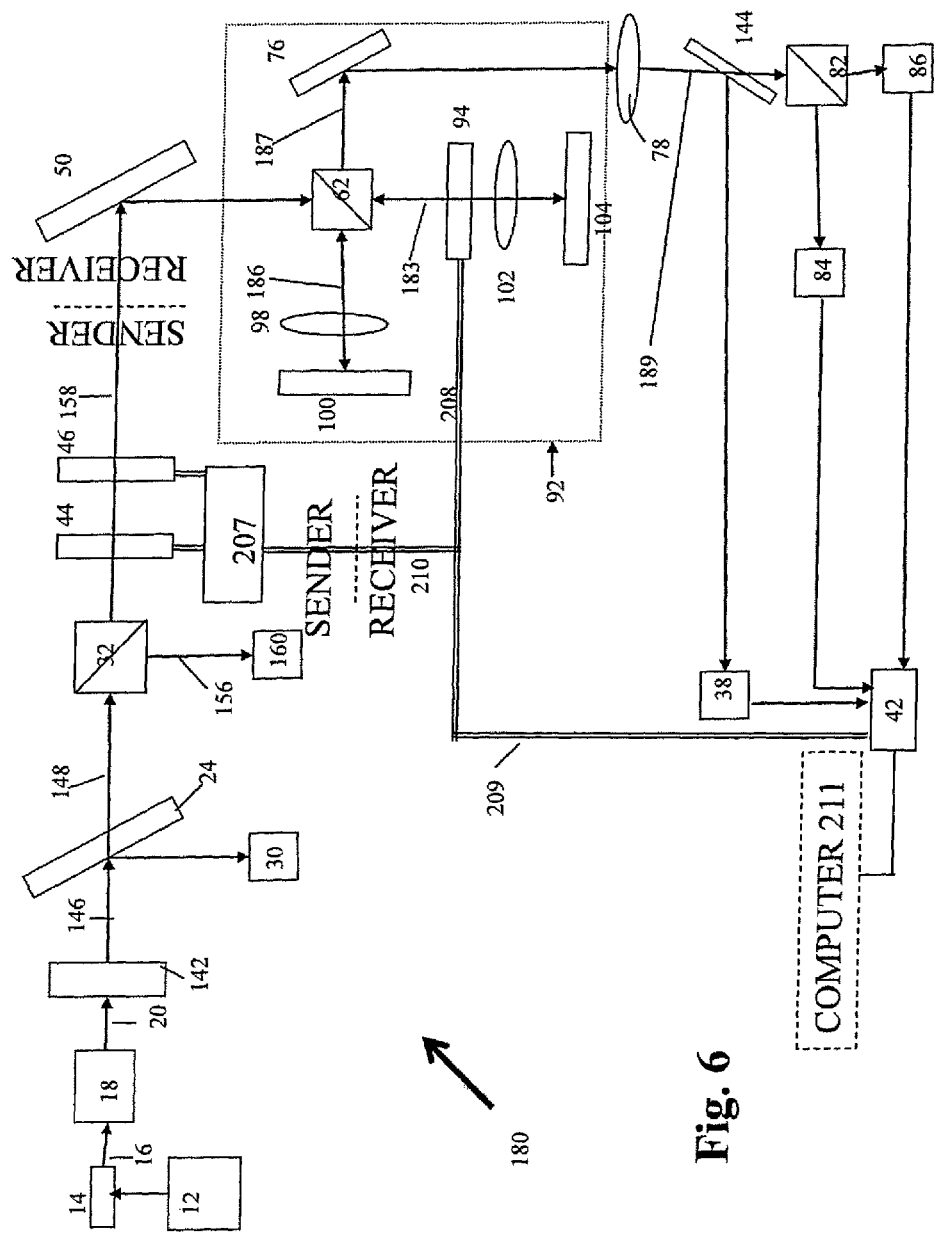
FIG. 6 is a schematic of an optical bench configured as a quantum computer system according to the present invention using a Type-I nonlinear optics crystal and a polarization Mickelsen interferometer to perform a QFT.

Referring now to FIG. 6, a Type-I nonlinear optical crystal analog system is depicted in general at 180 relative to system 90 of FIG. 3, where like numerals used with reference to FIG. 5 correspond to the description of those previously described with respect to the proceeding figures. A Type-I nonlinear crystal 142 generates entangled photon pairs with the same known polarization from photons 20. Preferably, the crystal 142 is tuned for non-degenerative down conversion with regard to dichroic minor 144. The entangled photon pair with same known polarization 146 is separated from frequency shifted components 145 that are terminated at beam stop 30. The monochromatic known polarization beam 148 is incident on polarization beam splitter 32 and that component with a known photon state 150 is directed through a polarization modulator 44, a phase modulator 46 to yield an arbitrarily oriented elliptical polarization state 158 that is reflected off minor 50 and into an interferometer shown generally at 92 that has the geometry of a polarization Mickelsen interferometer. The interferometer 92 receives the arbitrarily oriented elliptical polarization state 158 incident on a polarization beam splitter 62 that splits the arbitrarily oriented elliptical polarization state 158 with one component of the polarization 183 phase shifted at phase modulator 94 relative to the other polarization component 186. The polarization component 186 interacts with a quarter wave plate 98 rotating polarization by 90 degrees. Phase polarization component 186 is then reflected from mirror 100 back to polarization beam splitter 62 where the phase component 186 is recombined with phase shifted polarization component 183 that has passed through polarization modulator 94, a quarter wave plate 102 rotating the polarization by 90 degrees and returning to polarization beam splitter through reflection off of translating mirror 104. Second photon state 156 is directed onto beam stop 160. The arbitrarily oriented elliptical polarization state 158 retains characteristics of the data set signal to be subsequently transformed in any previously measured photon state, if such is known. The combined state 187 is transmitted through a half wave plate 78 oriented at so as to perform a quantum Hadamard transform to yield recombined transformed output 189. The recombined transformed output 189 is such that one of the photon components thereof is reflected by dichroic mirror 144 to single photon counting module 38 while the other photon component is carried to beam splitter 82 to yield a single photon registered on one of the single photon counting modules 84 or 86.

Single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement.

Figure 7:
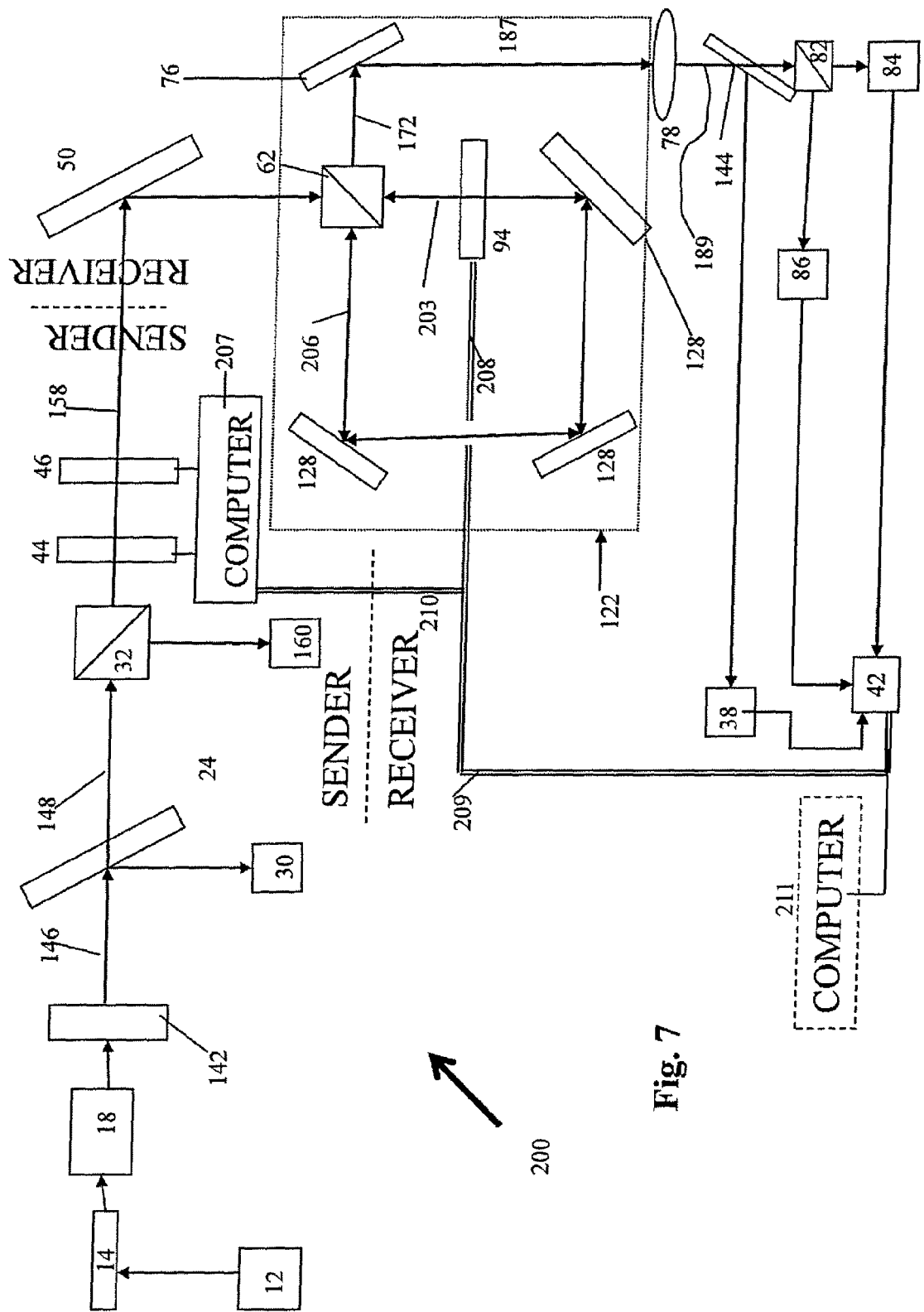
FIG. 7 is a schematic of an optical bench configured as a quantum computer system according to the present invention using a Type-I nonlinear optics crystal and a polarization Sagnac interferometer to perform a QFT.

Referring now to FIG. 7, a Type-I nonlinear optical crystal analog system is depicted in general at 200 relative to system 120 of FIG. 4, where like numerals used with reference to FIG. 4 correspond to the description of those previously described with respect to the proceeding figures. A Type-I nonlinear crystal 142 generates entangled photon pairs with the same known polarization from photons 20. Preferably, the crystal 142 is tuned for non-degenerative down conversion with regard to dichroic mirror 144. The entangled photon pair with same known polarization 146 is separated from frequency shifted components 145 that are terminated at beam stop 30. The known polarization beam 148 is incident on polarization beam splitter 32 and that component with a known photon state 150 is directed to a polarization modulator 44. The polarization modulator 44 and phase modulator 46 are controlled by computer 207, which determines which half of the data to process based upon the last measurement fed back from coincident detector 42, which is connected to the computer 207 by lines 209 and 110. The component with a known photon state is directed through a polarization modulator 44 and phase modulator 46 to yield an arbitrarily oriented elliptical polarization state 158 that is reflected off mirror 50 and into an interferometer shown generally at 122 that has the geometry of a polarization Sagnac interferometer. The interferometer 122 receives the arbitrarily oriented elliptical polarization state 158 incident on a polarization beam splitter 62 that splits the arbitrarily oriented elliptical polarization state 158 to phase shift a polarization component 203 through interaction with a phase modulator 94. Phase Modulator 94 is also connected to computer 207 by lines 208 and 210. The computer 207 controls the phase modulator 94 depending upon the stage of the Fourier transform. Optionally, a second computer 211 may be used to control phase modulator 94 if the phase modulator is at a remote location. The second component 206 is recombined with the phase shifted component 203 through coincidental reflection with the mirrors collectively labeled 128. Second photon state 156 is directed onto beam stop 160. The arbitrarily oriented elliptical polarization state 158 retains characteristics of the data set signal to be subsequently transformed in any previously measured photon state, if such is known. The combined state 187 is transmitted through a half wave plate 78 oriented at so as to perform a quantum Hadamard transform to yield recombined transformed output 189. The recombined transformed output 189 is such that one of the photon components thereof is reflected by dichroic mirror 144 to single photon counting module 38 while the other photon component is carried to beam splitter 82 to yield a single photon registered on one of the single photon counting modules 84 or 86.

Single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement. The coincidence electronics 42 feed the result back to the computer 207 via lines 209 and 210 so that the computer 207 determines which portion of the data to process next and how to prepare the data bases on the last measurement detected by the coincidence electronics. This feature is depicted in FIG. 1A where dotted lines are used to show data paths which are no longer in use and the 4 BINS labeled R are no longer used, while the 4 BINS labeled L remain to be processed. By making a determination not to use the 4 BINS labeled R as depicted in FIG. 1A, data compression is achieved.

Figure 9:
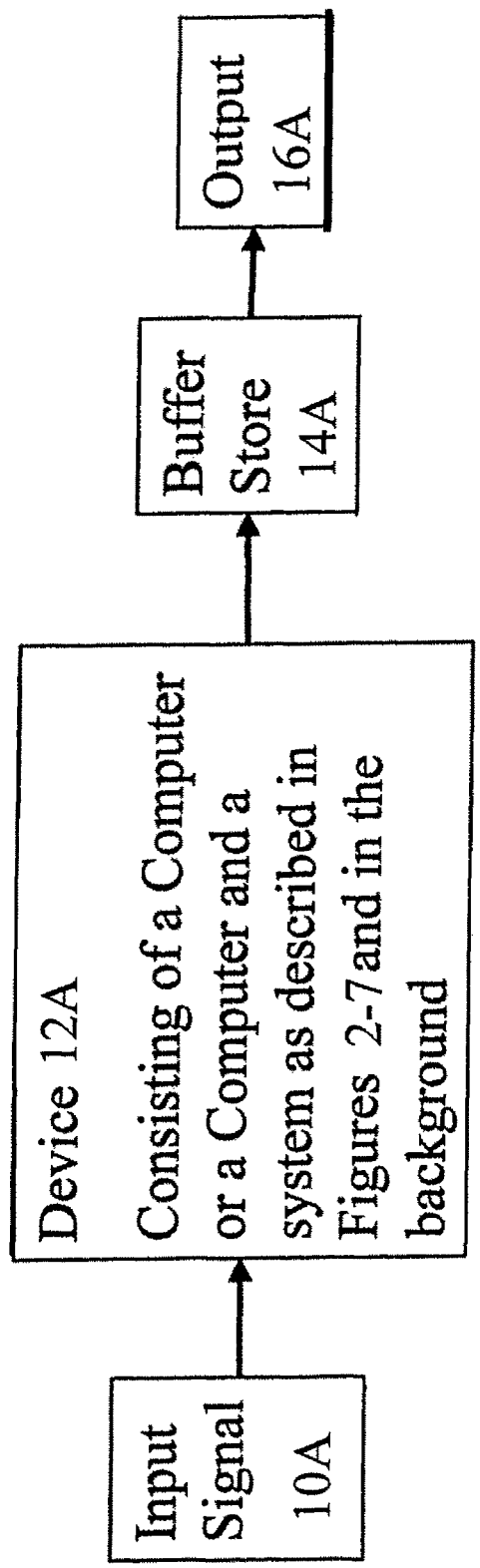
FIG. 9 is a broad block diagram of a system embodying the present invention.

FIG. 9 is a broad block diagram depicting an embodiment of the present invention. Broadly, in the system of FIG. 9, a classic computer 12A (or a classical computer with devices as described in FIGS. 2-7) is loaded with an input signal 10A. The system 12A then performs a quantum Fourier transform and either a classical inverse Fourier transform or a quantum inverse Fourier transform. The output of system 12A is provided to a buffer store 14A. From the buffer store it may be provided to an output device 16A on either a real time or delayed basis as still images, video images, movies, audio sound representations, and the like.

Example

Sound Spectrum Computation

Figure 8:
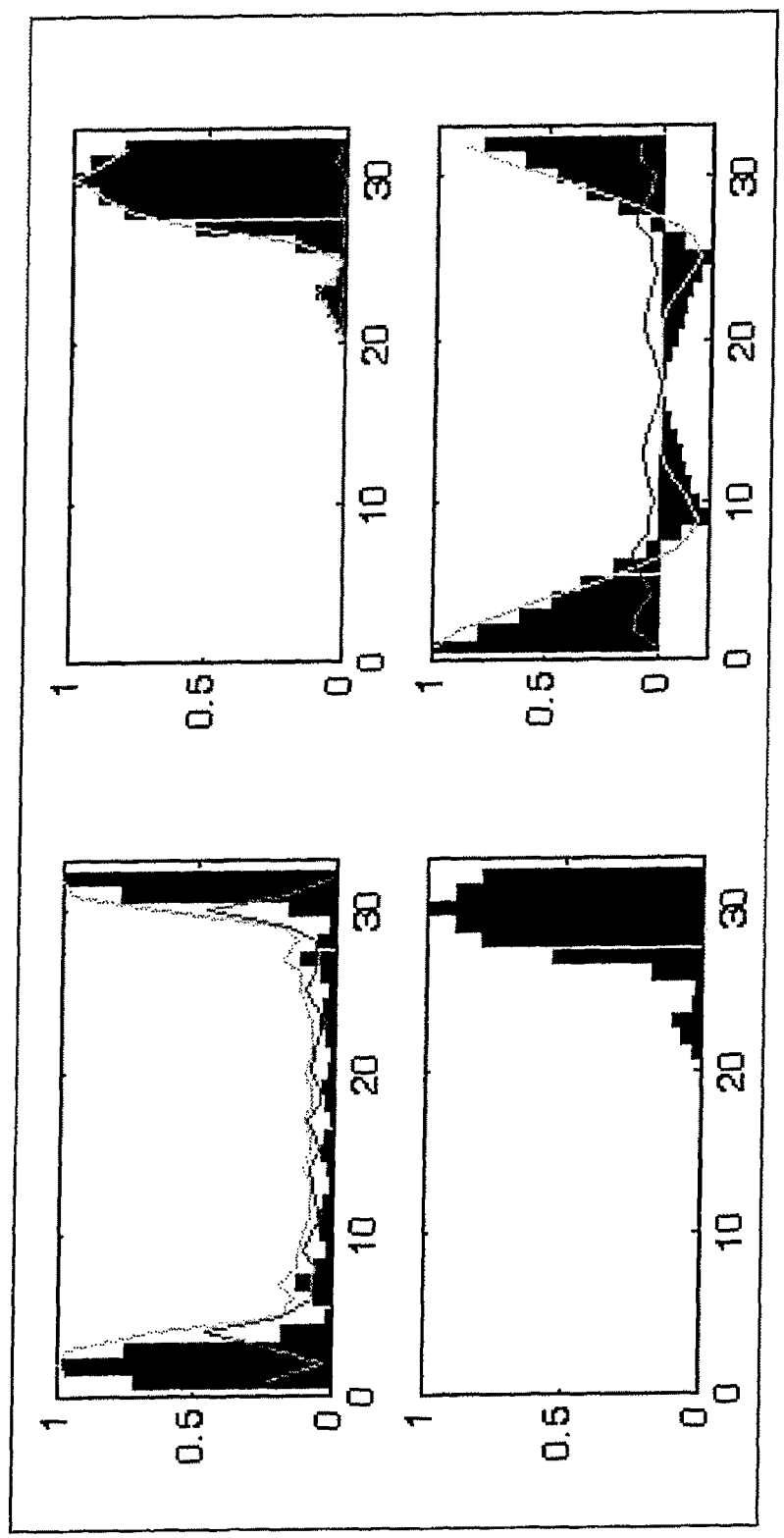
FIG. 8 is a series of 32 normalized sound spectrum samples depicted as a quantized histogram of amplitudes, black line and gray line overlies denoting classical and quantum Fourier transforms of the sample, respectively.

In order to evaluate the ability of the inventive quantum algorithm to compress and transmit a signal representative of the data set with a comparatively small number of photons, 32 sound samples defining a normalized arbitrary spectrum are provided in the top left panel of FIG. 8. The histogram defines a quantized spectrum while the solid lines superimposed thereover represent classical Fourier (gray line) transform and QFT (black line) fits to the data. The 32 sound sample elements of the top left spectrum are amenable to storage and operation on $2^n$ or 5 qubits. The top right panel of FIG. 8 represents a single statistical evaluation of the arbitrary spectrum depicted in the top left panel. The line superimpositions on the histogram in the top right represents a classical and quantum magnitude superposition. The lower left panel is duplicative of the conventional four photon single evaluation of the arbitrary spectrum (upper left panel) and represents the input signal into the quantum computer depicted in FIG. 2. The lower right panel depicts the reconstructed arbitrary spectrum (upper left panel) based on quantum Fourier transform as described herein, followed by an inverse Fourier transform. The solid overlapping lines represent reconstructed probability and classical magnitudes.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The terminology "computer" as used herein means processor, microprocessor, CPU, multiprocessor, personal computer or any device which has the capability of performing the functions of a computer.

The foregoing description is illustrative of particular embodiments of the invention, but is not meant to be a limitation upon the practice thereof. The following claims, including all equivalents thereof, are intended to define the scope of the invention.

APPENDIX A COMPUTER LISTING

```
function scqft
% Test of Semi-Classical Fourier
%%profile on
warning('off', 'all')
H=hadamard(2)*sqrt(2) /2;
%%[ys Fs bits] =wavread('hal90005k.wav');
[ys Fs bits]=wavread('kennedy_PCMa.wav');
%%[ys Fs bits]=wavread('postest2.wav');
%%[ys Fs bits]=wavread('chimes.wav');
%[ys Fs bits]=wavread('G2.wav');
%%[MM NN]=size(ys)
%%%sb=fix(size(ys(512+1:512+2^17)));
sb=fix(size(ys));
%%sb=fix(size(ys(1:256)))
NBits=fix(log2(sb(1)))+1
%%% TEST
%%NBits=10
NBits=19
%%NBits=15
%%ttt=BuildPhase(1,3)
pause
2^NBits
A=zeros(2^NBits,1);
AR=A;
%%AR(1:2^NBits)=ys(1:2^NBits);
AR(1:sb(1))=ys(1:sb(1));
%%AR=AR+.1;
%%AR=[-sqrt(-.25) .2 sqrt(-.6) 1];
%%AR=[1 0 0 1 0 0 1 0 0 1 0 0 1 0 0 1];
%%AR=[-sqrt(-1) -.25 .75*sqrt(-1) 1];
%%AR=2*rand(1, 2^NBits-1;
%%R=sqrt(AR);
AR=AR/sqrt(sum(AR.*conj(AR)));
%%AR=transpose(AR);
[min(AR) max(AR)]
plot(AR)
hold on
arsize=size(AR)
%%pause
% Output Subset
wavwrite(AR,Fs,bits, 'haltest.wav')
AR1=AR-min(AR);
AR1=AR1/max(AR1);
wavwrite(AR1,Fs,bits,'haldc.wav')
clear AR1
asum=sum(abs(AR))
A=AR;
A(1:2^NBits)=0;
%%% TEST AR1 was AR
A(1:2^NBits)=AR(1:1:2^NBits);
size(A)
size(AR)
clear AR
NSamples=5;
```

```
spectrum=zeros(2^NBits,1);
spectrum2=spectrum;
posum=spectrum2;
A2=A.*conj(A);
'A2 Sum'
a2sum=sum(A2)
sum(A2/a2sum)
[min(A2) max(A2)]
wavwrite(sqrt(A2),Fs,bits,'haltest2.wav')
%%%plot(sqrt(A2),'green')
%%%hold off
%%%chunkmx=2^7; %2^4
chunkmx=2^0;
%%%chunkmx=2^8;
%%%chunkmx=2^0
chunksz=2^NBits/chunkmx
'Done Readin'
pause
%%%for ichunk=1:chunkmx
%%%    [ichunk chunkmx]
%%%    istart=(ichunk-1)*chunksz+1;
%%%    istop=istart+chunksz-1;
%%%    A2T=A(istart:istop);
%%%    A2Tsum=max(abs(A2T));
%%%    spectrum2=fft(A2T);
%%%    spectrum2=(spectrum2.*conj(spectrum2));
%%%    ssum=sum(spectrum2);
%%%    spectrum2=spectrum2/ssum;
%%%    spmx=max(spectrum2);
%%%    A2IF=ifft(sqrt(spectrum2));
%%%    AO(istart:istop)=real(A2IF)/sum(abs(real(A2IF)));
%%%    plot(AO(istart:istop),'red')
%%%    hold on
%%%    plot(A2(istart:istop),'green')
%%%    plot(spectrum2,'cyan')
%%%    hold off
%%%    drawnow
  %% Normalize
%%%    AO(istart:istop)=A0(istart:istop)*A2Tsum;
%%%end
%%%plot(real(AO),'red')
%%%hold on
%%% 'AO'
%%%[max(real(AO)) max(real(A2)*asum)]
%%%hold off
%%%AO=AO/max(abs(AO+eps));
%%%wavwrite(AO,Fs,bits,'haltest3.wav')
%%pause
%%%clear AO
%%profile on
A2S=A2;
A2SSUM=sum(A2S)+eps;
A=A/sqrt(A2SSUM);
A2S=A.*conj(A);
'sum test'
sum(A.*conj(A))
clear A2S
CBits=log2(chunksz)
ipend=1;
%%% Build List of U operators
for ii=CBits:-1:1
    ii
    nn=2^CBits; mm=nn;
    UL(ii).H=BuildU(ii,H);
end
pause
for ichunk=1:chunkmx
    tic
    [ ichunk chunkmx ]
    istart=(ichunk-1)*chunksz+1;
    istop=istart+chunksz-1;
    ipend=ipend+chunksz;
    spct1=zeros(2^CBits,1);
    posum=spct1;
    spctI=spct1;
    % Extract Subset of Input Signal and Normalize
    A2S=A2(istart:istop);
    A2SSUM=sum(A2S)
%%% subplot(2,2,3)
%%% A2S=A2S/(A2SSUM+eps);
%%% bar(A2S/(max(A2S)+eps))
%%% [min(A2S) max(A2S)]
%%% a2mx=max(A2S);
%%% axis([0 2^CBits+1 0 1.01])
    % Extract Sub-sample for state preparation
    A2S=A2(istart:istop);
    AIS=A(istart:istop);
    % Prepare for QFT
    spct1=zeros(2^CBits,1);
    posum=spct1;
    apsum=posum;
    aspct=posum;
    A2I=A2S/sum(A2S);
    AI=AIS/norm(AIS,2);
    AMX=max(abs(A(istart:istop)));
    if (sum(AI)~=0)
        for IS=1:NSamples
            y(1:CBits)=0;
            % Start QFT
            IB=0;
            AN=transpose(AI);
            for ii=CBits:-1:1
                IB=IB+1;
                % Build U for this operation on the state
                %%%U=BuildU(ii,H);
                % Multiply U by the current state
                %%%nn=2^ii; mm=nn;
                API=UL(ii).H*transpose(AN);
                % Find probabilities
                P=API.*conj(API);
                % Extract Probabilties of Measuring
                % current Qbit in state |1>
                isto1=2^ii;
                istr1=floor(isto1/2)+1;
                P1=sum(P(istr1:isto1));
                % Meausure Qubit
                y(ii)=MeasureQ(P1);
                if(ii ~= 1)
                    % Extract new state
                    if(y(ii)==0)
                        AN=API(1:istr1-1);
                    else
                        AN=API(istr1:isto1);
                    end
                    AN=AN/norm(AN,2);
                    % Build controlled Phase operation
                    R=BuildPhase(y(ii),CBits-IB);
                    % Multiply that state by the controlled
                    % phase
                    AN=R*AN;
                    clear R;
                    AN=transpose(AN);
                end
            end
            str2=num2str(y(CBits:-1:1),'%ld');
            [str2 ' ' num2str(ichunk) ' ' num2str(IS)]
            % Store measurements in index basis
%%%          subplot(2,2,1);
            str=num2str(y(1:CBits),'%ld');
            indx=fix(bin2dec(str))+1;
            spct1(indx)=spct1(indx)+1;
            spct1o=(spct1)/IS;
            spct1o=spct1/sum(spct1);
%%%bar(spct1o)
%%%     hold on
%%%     spctmx=max(spct1o);
%%%     p2=(abs(fft(A(istart:istop))));
%%%     p2=p2.*conj(p2);
%%%     p2=p2/(sum(p2)+eps);
%%%     plot(p2,'green')
%%%     spctmx=max(spctmx,max(p2));
%%%     axis([ 0 2^CBits+1 0 spctmx])
%%%     hold off
%%%     drawnow
            % Fourier Signal
%%%      subplot(2,2,4)
%%%      piqft=real(ifft(sqrt(spct1)));
%%%      piqft=piqft/sum(abs(piqft));
%%%      Piqft=piqft/max(abs(piqft));
%%%bar(piqft)
```

```
%%%        hold on
%%%        ap=AO(istart:istop)/(max(abs(AO(istart:istop)))+eps);
%%%        plot(ap, 'green')
%%%        hold off
%%%        pmx=max(max(piqft,ap'));
%%%        pmn=min(min(piqft,ap'));
%%%        axis( [0 2^CBits+1 pmn-eps pmx+eps])
%%%        drawnow
       end
    end
    'After Samples'
    % Classical IFT
    iqft=ifft(sqrt(spct1/NSamples));
    signal(istart:istop)=real(iqft)/sum(abs(real(iqft)));
    signal(istart:istop)=signal(istart:istop);%*AMX;
    a2ssum=sum(A2(istart:istop));
    toc
end
profile off
'Before Full Signal'
sigmx=max(abs(signal))
signal=signal/sigmx;
clf
plot(signal,'red')
drawnow
hold on
%%plot (real(AO),'green')
%%plot(A/max(abs(A)),'cyan')
waywrite(real(signal),Fs,bits,'qfthalNL.wav')
function answer=MeasureQ(prob)
s=rand;
answer=99;
while answer==99
    if(s<prob)
       answer=1;
    else
       answer=0;
    end
end
function answer=BuildU(N,H)
I=eye(2,2);
answer=sparse(H);
for i=1:N-1
    answer=sparse(kron(answer,I));
end
function answer=BuildPhase(y,NQ)
isize=2^NQ;
%answer=eye(isize,isize);
answer=speye(isize);
'Build Phase'
if (y==1)
    for IQ=1:NQ
       nchunks=2^(IQ-1);
       chunksize=isize/(2*nchunks);
       [IQ NQ nchunks chunksize]
       afac=exp(i*pi*y/(2^IQ));
       for ichunk=1:nchunks
%%         [ichunk nchunks]
          istart=(ichunk*chunksize)+1+(ichunk-1)*chunksize;
          istop=istart+chunksize-1;
          for IS=istart:istop
             c=fix( (istop-istart)*.1);
%%           if(mod(IS,c)==0)
%%             [IS istart istop]
%%           end
%%           answer(IS,IS)=answer(IS,IS)*exp(i*pi*y/(2^IQ));
             answer(IS,IS)=answer(IS,IS)*afac;
          end
       end
    end
end
C
```

The invention claimed is:

1. A method of data compression comprising:
converting data, with a converter, into n qubits representing $2^{(n)}$ bits of data; each qubit having two properties and with each half weighted for a first and second property respectively;
transmitting a first qubit with a transmitter;
measuring the first qubit, with a detector, at a receiver location;
determining whether or not to transmit portions of data from a sequential successive qubit based upon the value of the first qubit measured at the receiver location.

2. The method of claim 1 wherein the data comprises the contents of a message and based upon the value of the first qubit measured at the receiver location, data compression occurs such that fewer qubits are used to transmit the original contents of a message.

3. The method of claim 1 wherein the data comprises information to be transmitted to the receiver and based upon the value of the first qubit measured at the receiver location, data compression occurs such that fewer qubits are used to represent the data transmitted without curtailing the information received by the receiver.

4. A system for data compression and transmission comprising a sender and at least one receiver,
the sender comprising:
a converter for converting data into qubits;
a modulator for modulating a signal based upon the values of the qubits;
a transmitter for transmitting the modulated signal to at least one receiver;
the at least one receiver comprising:
a detector for measuring the value of at least one qubit;
a feedback circuit for transmitting the measured value of the at least one qubit to the sender;
whereby the transmission of data for each successive qubit is based upon the value measured for the preceding qubit and the sender utilizes only the data for each successive qubits which correlates to the measured value of the preceding qubit.

5. The system of claim 4 wherein for a group of n qubits, the amount of data represented by the $n^{th}$ transmitted qubit is $\frac{1}{2}^{(n-1)}$ the amount of data represented by the first transmitted qubit.

6. The system of claim 4 whereby the qubits are interrelated such that the measurement of the preceding qubit determines what portion of the data is unnecessary data for the next qubit.

7. The system of claims 6 wherein the information to be transmitted is substantially unaffected by the data which is not transmitted.

8. The system of claim 7 wherein the data to be transmitted represents a sound recording and the transmission of successive qubits where the $n^{th}$ transmitted qubit represents only $\frac{1}{2}^{(n-1)}$ the amount of data represented by the first transmitted qubit does not significantly impact the recognizability of the sound recording.

9. A method of transmitting a data signal comprising:
(a) dividing a signal into a series of sections with each section comprising N samples of the signal;
(b) preparing a first qubit from N samples of the signal using a Quantum Fourier transform;
(c) passing the qubit though a phase shift device;
(d) measuring the qubit and recording the result of the measurement as a 0 or 1;
(e) determining which half of the N samples of the current signal section are used as a subsection to prepare the next qubit, and discarding the remainder;
(f) preparing next qubit generated from the original signal section with the next qubit using only half of the succeeding signal subsection;
(g) passing the succeeding qubit though a phase shift device;
(h) measuring the succeeding qubit and recording the result of the measurement as a 0 or 1;

(i) determining which half of the N samples of the succeeding signal section are used as a subsection to prepare the next qubit, and discarding the remainder;

(j) repeating the steps (f) through (i) until the last qubit is prepared.

10. The process of claim 9 wherein the steps are repeated a number of times on the same signal section to generate a power spectrum representation of the signal section.

11. The process of claim 9 wherein the measurement of all of the qubits for one section produces a binary number that indicates the address of the bin addressed by that binary number.

12. A method of data compression comprising:
converting data, with a converter, into qubits;
transmitting a first qubit with a transmitter;
measuring the first qubit, with a detector, at a receiver location;
determining whether or not to transmit portions of data from a sequential successive qubit based upon the value of the first qubit measured at the receiver location, wherein based upon the value of tile first qubit measured at the receiver location, data compression occurs such that fewer qubits are used to transmit a message to the receiver.

13. The method of claim 12 wherein the data comprises knowledge information in the form of a communication to be sent to the sender and wherein based upon the value of the first qubit measured at the receiver location, fewer qubits are used to transmit the information to the receiver without affecting the content of the knowledge information.

14. The method of claim 12 wherein data is converted into n qubits and wherein for n equal to 3, the first qubit represents a first group of four bins weighted for a first photon characteristic and a second group of four bins weighted for the conjugate of the first photon characteristic; and, depending upon the measured value of the first qubit, only one half of the data is used to prepare the second qubit, represented by $2^{(n-1)}$ bins for transmission.

15. The method of claim 14 wherein the third qubit may be represented by four groups of two bins, and depending upon the measurement of the second qubit, data represented by 2 bins is transmitted and the data represented by the remaining 6 bins is discarded.

16. The method of claim 12 wherein each qubit represents $2^n$ bins of data, and for each successive qubit, data represented by the qubit is decreased by a factor of 2.

17. The method of claim 12 wherein each qubit is a photon and information is transmitted based upon the polarization of the photon.

* * * * *